United States Patent [19]

Dreyfus et al.

[11] Patent Number: 5,412,058
[45] Date of Patent: May 2, 1995

[54] NOVOLAKS OF THE PHENOL-DENSE ALDEHYDE TYPE

[75] Inventors: Thierry Dreyfus, Villiers sur Coudun; Noël Le Bourt, Compiegne, both of France

[73] Assignee: CECA S.A., France

[21] Appl. No.: 576,465

[22] PCT Filed: Jan. 23, 1990

[86] PCT No.: PCT/FR90/00049
§ 371 Date: Sep. 14, 1990
§ 102(e) Date: Sep. 14, 1990

[87] PCT Pub. No.: WO90/08790
PCT Pub. Date: Aug. 9, 1990

[30] Foreign Application Priority Data

Jan. 25, 1989 [FR] France ............ 89 00876

[51] Int. Cl.⁶ .................................. C08G 8/04
[52] U.S. Cl. .................. 528/129; 528/143; 528/150; 528/165
[58] Field of Search .......... 528/129, 143, 150, 165

[56] References Cited

U.S. PATENT DOCUMENTS 2,131,249  9/1938  Balle .................... 528/143

FOREIGN PATENT DOCUMENTS 0790644  2/1958  United Kingdom .

*Primary Examiner*—Morton Foelak
*Assistant Examiner*—Shelley A. Dodson
*Attorney, Agent, or Firm*—John L. Sigalos

[57] ABSTRACT

New formaldehyde-phenol resins of the novolak type comprising aliphatic aldehyde radicals with 6 or more carbon atoms and with the molar ratio between these heavy aldehyde radicals and the phenolic structures being between 0.9 and 1.2. They are obtained by the condensation of phenols with aldehyde compounds containing at least 543% heavy aldehydes in the presence of acid catalysts in a virtually anhydrous medium. Application to the reinforcement of vulcanized rubbers.

1 Claim, No Drawings

NOVOLAKS OF THE PHENOL-DENSE ALDEHYDE TYPE

I. TECHNICAL FIELD

The present invention pertains to phenolic novolak resins obtained by condensation with heavy aliphatic aldehydes, a procedure for their synthesis and their application to the reinforcement of rubber.

The phenolic resins, which are condensation products of phenols and aldehydes, have been known for more than 75 years (Baekeland, 1907, compositions of moldable products). They are categorized into two groups:

the resols (referred to as one-step resins) which are thermoreactive products obtained with an aldehyde: phenol ratio greater than 1 and under basic catalysis conditions;

the novolaks (referred to as two-step resins) which are thermoplastic products obtained with an aldehyde: phenol ratio lower than 1 and under conditions of acid catalysis. These novolaks can then be cross-linked under the effect of formaldehyde donors, i.e., hexamethylenetetramine or resins, such as phenolic resins or more or less etherified melamine resins.

II. PRIOR TECHNIQUE

The novolaks have had noteworthy industrial applications for a long time, e.g., as powders for molding and as binding resins for brake fittings. They provide particular value in the reinforcement of rubbers where it is necessary to make pieces which must resist abrasion or deformation, e.g., tire treads or beads, window washers, conveyor belt rollers, printing rollers.

The aldehyde which is by far the most widely used for the synthesis of novolaks is formaldehyde or one of its precursors, paraformaldehyde, trioxane or hexamethylenetetramine. Aliphatic dehydes are also employed to a lesser extent. Thus, the use of acetaldehyde or paraldehyde (a polymer of acetaldehyde) is described in German Patent DP 365,286 (Farbwerk vorm. Meister Lucius & Brüining, 1920), in U.S. Pat. No. 1,370,666 (E. E. Novotny, 1921) and U.S. Pat. No. 1,598,546 (Bakelite Corp., 1926). In U.S. Pat. No. 2,176,951 (Resinox Corp., 1937), which claims the synthesis of phenol/butyraldehyde resins with basic catalysts, the example is given with a phenol:butyraldehyde ratio of 1:0.7. U.S. Pat. No. 2,231,860 (Monsanto, 1941) describes mixed phenol/butyraldehyde/formaldehyde resins obtained by condensation in two stages: condensation of the phenol with butyraldehyde with acid or basic catalysts, then condensation with formaldehyde in an acid medium. In European Patent EP 19,151 (BASF, 1980) are described phenol/isobutyraldehyde resins intended for the manufacture of flexographic printing inks, created with isobutyraldehyde: phenol molar ratios apparently greater than 1. However, reading shows (see page 3, lines 1 to 3 of the French translation of this patent) that although these novolak resins are indeed prepared with isobutyraldehyde: phenol molar ratios between 1.2:1 and 1.3:1, their true molar ratio after reaction is in fact less than 1. The excess of isobutraldehyde is probably caught up in low-molecular weight condensates, the elimination of which by steam distillation constitutes the improvement claimed in European Patent Application EP 50,230 (BASF, 1981). We can also find in French Patent Application 2,132,359 (Uniroyal, 1982), the description of resorcin/alkyl aldehyde novolaks with 1 to 4 carbons, and their claim for use in the adhesion of rubber to textile cables.

III. PRESENTATION OF THE INVENTION

The Applicant discovered that, surprisingly, the novolak resins obtained by condensation of phenols and heavy aldehydes (i.e., with a number of carbons equal to or greater than 6) had structures different from the structures of novolak resins based on formaldehyde, that they could be obtained with aldehyde: phenol molar ratios greater than 1, and with yields close to the theoretical. This teaching is not found in the prior state of the art, and although the patents which cite heavy-aldehyde novolaks, such as, e.g., U.S. Pat. No. 2,173,346 (Bakelite Corp, 1935), GB Patent 790,644 (Esso Research) or U.S. Pat. No. 2,131,249 (Balle), embody reactive masses in which the aldehydes: phenols ramos are close to unity, they lead only to novolaks with the same stoichiometry as the known novolaks because of their relatively low yields.

With structures of the type $[\Phi CH(R_{n-1})]_p$-$\Phi$ which are normally attributed to the novolaks of the prior art, gelation occurs for aldehyde: phenol ratios of a maximum of 0.85–0.90 (see Knop and Pilato, "Phenolic Resins," Springer Verlag pub., 1985, p. 25). There is no knowledge of the structures of the novolaks in accordance with the invention which accept without gelation noteworthy excesses of aldehyde in relation to the theoretical, and notably those of resins with an aldehyde: phenol molecular ration greater than 1. Nuclear magnetic resonance proton analyses of the novolak resins prepared solely from heavy aldehyde confirm that for an aldehyde with n carbons the ratio between the number of protons of the aliphatic chain "$CH_3(CH_2)_{n-2}$" of the aldehyde carried by the carbons which are not linked to the two phenol rings to the proton carried by the carbon linking the two phenol rings "$\Phi CH(R_{n-1})\Phi$" ($\Phi$=phenol ring) is greater by at least 50% than the expected theoretical value, i.e. $(2n-1)$. Resins synthesized with mixtures of heavy aldehyde and formaldehyde appear to have a structure which is intermediate between that of the phenol/formaldehyde novolak resins and that of the phenol/heavy-aldehyde novolak resins.

Thus, the present invention pertains to novolak-type resins which result from the condensation in the presence of acid catalysts of aldehyde reagents and phenol reagents in an aldehydes: phenols ratio between 0.9 and 1.2, with the aldehyde reagents comprising in a characteristic manner at least 50% by weight of compounds of the aliphatic aldehyde type with a number of carbons equal to or greater than 6. The invention also pertains to the method for obtaining them and their application, notably as rubber-reinforcing resins.

The novolaks of the invention can be cross-linked by addition of a formaldehyde donor such as, e.g., hexamethylenetetramine, paraformaldehyde, etherified melamine-formaldehyde resins or phenolic resins of the resol type. They have a melting point measured according to the ball and ring method (AFNOR T 66 008 or DIN 53180 methods) between 50° and 150° C., and preferentially between 80° and 120° C.

The phenols which can be employed in the invention are phenols with a functionality, understood as the number of reactive sites available for the condensation of the formaldehyde, which is greater than 2 such that the novolak resin has a branched structure which can be subsequently cross-linked into a three-dimensional product by reaction with a formaldehyde donor. As examples of these phenols, we can cite phenol, the para-bisphenols, resorcin, metacresol and, more generally, the phenols which are alkylated in the meta position. Use can also be made of chain extenders, small amounts of bifunctional phenols, such as the phenols which are alkylated in the ortho or para position; it is then necessary that the average functionality of the phenols remain greater than 2 in order that the novolak obtained will be three-dimensionally cross-linkable.

The aldehydes employed in the invention are aliphatic aldehydes with a number of carbons equal to or greater than 6, which can be linear or branched. One can also use mixtures of isomers derived from oxo syntheses, by addition of carbon monoxide and hydrogen to propylene oligomers or linear olefins. The preferred aldehydes of the invention are those with a number of carbons between 6 and 20, preferentially between 6 and 15.

The Applicant also discovered a synergistic effect linked with the use of mixtures of heavy aldehydes and formaldehyde in the syntheses of novolaks, which is manifested by a very perceptible and completely unexpected increase in the hardness of the vulcanized mixtures of rubbers and these resins without loss, however, of the excellent viscosity of these mixtures in the crude state. In the mixed resins in accordance with the invention, it is preferred that the heavy aldehyde be present as a whole at 50% of the total weight of the aldehydes.

Use can also be made of unsaturated aliphatic aldehydes in a mixture with the heavy aldehydes. However, in this case the maximum level of these unsaturated aldehydes must be such that the structure of the novolaks is still cross-linkable: in fact, the unsaturated aldehydes react via their double bond on both the phenol ring and the hydroxyl, thereby yielding arylalkylethers, which decreases the functionality and the reactivity of the phenols (See R. N. Dongre, Ind. Eng. Chem. Prod. Res. Dev., Vol. 24, No. 4, 1985, which shows that the phenol/crotonaldehyde novolaks remain thermoplastic, even after cross-linking with hexamethylenetetramine). In accordance with the invention, it is preferred that the level, expressed in moles per moles, of unsaturated aldehyde does not exceed 40% of the total aldehydes. Obviously, one can also add small amounts of other aldehydes, e.g., acetaldehyde, butyraldehyde, furfuraldehyde, benzaldehyde.

The molar ratio between the phenols and the heavy aldehydes obviously depends on the phenols employed for the synthesis. If we start solely with phenol with a heavy aldehyde, the aldehyde:phenol molar ratio can vary between 0.8:1 and 1.3:1. At ratios lower than 0.8:1, the yields are not as good because the unreacted phenol must be eliminated since rubber processors require resins with a free-phenol level lower than 1% for toxicity reasons. At ratios higher than 1.3:1, gelation of the novolak occurs during the synthesis. It is, in addition, surprising that it is possible to obtain such high molar ratios since for phenol/formaldehyde resins it is difficult to exceed molar ratios of 0.8:1 without gelation or without the resultant resins having melting points which are incompatible with use in rubber.

One of the advantages of the heavy aldehydes is that one thereby obtains high-molar-ratio resins with excellent mass yields, very close to the theoretical ratios corresponding to the weights of the phenol and heavy aldehyde introduced, solely diminished by the water of condensation, and this for aldehyde: phenol molar ratios greater than 1 in the final resin. By following the teachings of the prior art (notably that of European Patent EP 19,151), it was not known how to obtain phenol/formaldehyde novolak resins with a free-phenol level equal to or lower than 1% except by eliminating the free phenol from condensation products that contained more than 5% —an operation which increases the complexity of the procedure and has a negative impact on its yield.

IV. METHODS FOR IMPLEMENTING THE INVENTION

The synthesis conditions for these novolak resins are such that the medium is anhydrous or virtually anhydrous. Thus, one operates without addition of water by pouring the heavy aldehyde into the mixture of phenols and catalyst using azeotropic distillation for continuous elimination of the water of condensation formed with recycling of the aldehyde which is separated out in the Florentine receiver. The distillation can be improved by addition of a hydrophobic solvent to improve the distillation, e.g., by an aromatic solvent such as toluene.

The catalysts which can be employed in the invention are of the strong acid type, such as concentrated sulfuric acid or sulfonic acids. The amount to be used is less than 5% by weight in relation to the phenols and generally between 0.1 and 1% by weight in relation to the phenols.

Operations can be carried out in two ways in the case of mixed resins with formaldehyde. A first condensation of the phenols with the heavy aldehyde can be carried out and then, after the end of the azeotropic distillation, a second condensation with formaldehyde is carried out under the conditions which are well known by the expert in the field. Alternatively, it is possible to start by condensating the formaldehyde and the phenols followed by condensation of the heavy aldehyde on the reactional mixture; in this case., it is necessary to have a virtually anhydrous synthesis medium when beginning to pour in the heavy aldehyde. This can be easily implemented by the expert in the field, e.g., by concentrating the reactional medium under vacuum or carrying out azeotropic distillation. If use is made of mixtures of heavy aldehydes with unsaturated aldehydes, the unsaturated aldehydes can be condensed either at the beginning or at the end, or in mixture with the heavy aldehyde; but, in any case, it is necessary that the condensation be carried out in an anhydrous or virtually anhydrous medium.

The other synthesis conditions are very conventional. After introduction of the heavy aldehyde, azeotropic distillation is continued until water is no longer released. If it is deemed necessary, neutralization of the resin can then be carried out. The resin is then concentrated under vacuum until a constant melting point is obtained. It is then cooled and put into flake, tablet or piece form.

V. INDUSTRIAL APPLICATION POSSIBILITIES

The resins in accordance with the invention are distinguished from the previously known novolak resins notably by their very improved properties for reinforcement of vulcanized rubbers. In addition, they provide a very noteworthy reduction in the viscosity of the crude rubber. This is possibly due to the long aliphatic chain provided by the heavy aldehydes or to the special structure of these novolak resins. In order to obtain this reinforcement effect, the resin is mixed with the rubbers and the necessary fillers by well-known means in internal or external mixers, e.g., at a temperature between 80° and 170° C. After the rubber mixture is cooled, vulcanization agents as well as the resin hardener are introduced at temperatures generally between 80° and 120° C. so as not to induce premature cross-linking and vulcanization.

The products for cross-linking the resin, which becomes infusible, are formaldehyde donors such as hexamethylenetetramine, paraformaldehyde, trioxy- or tetraoxy-methylene, etherified melamine resins, e.g., hexamethoxymethoylolmelamine, or phenolic resins.

The rubbers which can be used with these resins are, e.g., natural rubbers, synthetic rubbers such as styrene-butadiene, the acrylonitriles, butyls, ethylene-propylene-diene elastomer copolymers (EPDM), polybutadienes, polyisoprenes or mixtures of rubbers.

The conventional fillers can be added to the rubbers, such as activated silicas, carbon black, kaolin, chalk, zinc oxide, stearic acid, oils, protection agents, cross-linking agents, vulcanization accelerators and other conventional additives.

The resins in accordance with the invention are added to the rubbers at levels between 5 and 100 parts by weight, and preferably from 10 to 60 parts by weight, per 100 parts of rubber.

The resin hardeners are introduced, for example, at levels from 1 part by weight to 80 parts by weight, and preferably from 3 to 25 parts by weight, per 100 parts of resin. This level obviously depends on the type of cross-linking agent employed. Nevertheless, it is remarkable that for the resins of the invention, the optimal hardener level is clearly lower than that required for formaldehyde-based novolak resins: this is a very positive characteristic for application to rubber vulcanization, an operation in which an excess of resin hardener, notably hexamethylenetetramine, has a negative effect both on the operation itself and on the quality of the finished product. The expert in the field Can easily determine with a small number of tests the optimal level of hardener required for each novolak.

The rubbers are then prepared in accordance with the usual techniques, e.g., by molding, extrusion or calendering, then vulcanized, e.g., on a press or in hot-air ovens or microwave ovens, at a temperature between ca. 130° and 210° C.

VI. EXAMPLES

The invention is illustrated by the following nonlimitative examples in which, unless otherwise specified; the percentages are expressed in weight per weight.

Example 1

Into a three-necked flask equipped with a Dean-Stark separator, a dropping funnel and a stirring apparatus, one introduces while stirring 470 grams of phenol (5 moles) and 4.75 grams of sulfuric acid concentrated to 96%; this is brought to 100° C. and over two hours one pours in 570 grams (5 moles) of heptanal (commercial product at 95% heptanal) while using azeotropic distillation to eliminate, the water formed; the azeotropic distillation is then continued for 2 hours; 85 grams of water (4.72 moles, i.e., 99% of the theoretical in relation to the heptanal) is collected; concentration is then carried out at atmospheric pressure until 200° C.; it is put under vacuum and maintained for 30 minutes at 200° C. at a pressure of 50 mm Hg (weight of distillate: 64 grams). The resin is decanted. The yield is 909 grams (i.e., a yield of 98% in relation to the raw materials employed, taking into account the purity of the aldehyde). The ball-and-ring melting point is 83° C. and the free-phenol content is 0.5%.

Nuclear magnetic resonance proton analysis carried out on a Bruker spectrometer with a principal magnetic field at 200 megahertz yields the following results:

| Nature of the protons | Aromatics | $\phi CH(R_{n-1})\phi$ bridges | $R_{n-1}$ aliphatic chains |
| --- | --- | --- | --- |
| Chemical displacement (ppm) | 6.5–7.6 | 3.8–4.7 | 0.8–2.8 |
| Integration surface | 125.2 | 28.7 | 662.4 |

The ratio of the number of aliphatic protons to the number of protons linked to the phenol rings is equal to 23.08, i.e., 78% larger than the theoretical value of 13.

Comparative analysis of a phenol/formaldehyde novolak resin having a ball-and-ring melting point of 100° C. and a free-phenol content of 0.8% yields:

| Nature of the protons | Aromatics | $CH_2$ bridges | Aliphatic chains |
| --- | --- | --- | --- |
| Chemical displacement (ppm) | 6.6–7.3 | 3.6–4 | — |
| Number of bonds per phenolic ring | 3.4 | 1.6 | — |

From these figures, we can deduce an average number of 3 rings per chain.

Example 1 bis (Counterexample)

Into a three-necked flask equipped with a Dean-Stark separator, a dropping funnel and a stirring apparatus, one introduces while stirring 796.6 grams of phenol (8.47 moles) and 8 grams of sulfuric acid concentrated to 96%; this is brought to 100° C. and over two hours one pours in 611.4 grams (8.47 moles) of isobutyraldehyde while using azeotropic distillation to eliminate the water formed. The azeotropic distillation is then continued for 2 hours; concentration is then carried out at atmospheric pressure until 200° C.; it is put under vacuum and maintained for 30 minutes at 200° C. at a pressure of 50 mm Hg. The resin, a red solid, is decanted at a yield of 645 grams (i.e., a yield of 51% in relation to the raw materials employed and taking into account their purity). The ball-and-ring melting point is 108.5° C. and the free-phenol content is 0.5%.

Example 1 ter

Into a three-necked flask equipped with a Dean-Stark separator, a dropping funnel and a stirring apparatus, one introduces while stirring 846 grams of phenol (9 moles), 200 grams of toluene and 2.1 grams of sulfuric acid concentrated to 96%. This is brought to 100° C. and over two hours one pours in 388.8 grams (5.4 moles) of n-butyraldehyde while using azeotropic distillation to eliminate the water formed. The azeotropic distillation is then continued for 1 hour; 97 grams of water (i.e., 99.5% of the theoretical) is collected. Concentration is then carried out at atmospheric pressure until 200° C.; it is then put progressively under vacuum until 50 mm Hg. This pressure is maintained at 200°–210° C. for 30 minutes. The resin is decanted in the form of a reddish brown-black solid. The yield is 860 grams (i.e., 75.5% of the theoretical). The ball-and-ring melting point is greater than 108.5° C. and the free-phenol content is 0.4%. If the n-butyraldehyde:phenol molar ratio is increased to 0.7, the ball-and-ring melting point becomes greater than 130° C. for a virtually unchanged mass yield.

The NMR proton analysis of this resin is the following:

| Nature of the protons | Aromatics | $\phi CH(R_{n-1})$ bridges | $\phi R_{n-1}$ aliphatic chains |
|---|---|---|---|
| Chemical displacement (ppm) | 6.3–7.7 | 3.7–4.7 | 0.6–2.6 |
| Integration surface | 300.4 | 83.9 | 578.7 |
| Number of protons per phenolic ring | 3.24 | 1.76 | — |

The integration ratio of the aliphatic protons to the number of protons linked to phenol rings is 6.9 for a theoretical value of 7.

Calculation yields an average number of 8.33 phenol rings per chain and a molar ratio of 0.88 in the finished resin. If we assume that all of the C4 aldehyde that was introduced reacted then the expected theoretical yield is 867 grams, which is very close to the experimental yield.

Example 2

Into a three-necked flask equipped with a Dean-Stark separator, a dropping funnel and a stirring apparatus, one introduces while stirring 376 grams of phenol (4 moles), 100 grams of toluene and 3.8 grams of sulfuric acid concentrated to 96%; this is brought to 100° C. and over two hours one pours in 750 grams (4.8 moles) of C10 aldehyde, while using azeotropic distillation to eliminate .the water formed. This aldehyde is obtained by "oxo" synthesis from propylene trimers; titration shows that it contains 98.5% C10 aldehyde and is comprised of a large number of branched isomers. The azeotropic distillation is then continued for 2 hours; concentration is then carried out at atmospheric pressure until 200° C.; it is put under vacuum and maintained for 30 minutes at 200° C. at a pressure of 50 mm Hg. The resin is decanted at a yield of 982 grams (i.e., a yield of 95% in relation to the raw materials employed, taking into account the purity of the aldehyde). The ball-and-ring melting point is 100° C. and the free-phenol content is 0.35%.

The NMR proton analysis of this resin is the following:

| Nature of the protons | Aromatics | $\phi CH(R_{n-1})\phi$ bridges | $R_{n-1}$ aliphatic chains |
|---|---|---|---|
| Chemical displacement (ppm) | 6.5–7.6 | 3.6–4.7 | 0.4–2.5 |
| Integration surface | 50 | 10.3 | 398.9 |

The ratio of the number of aliphatic protons to the number of protons linked to phenol rings is 38.7, i.e., 104% larger than the theoretical value of 19.

Example 3

Into a three-necked flask equipped with a Dean-Stark separator, a dropping funnel and a stirring apparatus, one introduces while stirring 470 grams of phenol (5 moles), 4.75 grams of sulfuric acid concentrated to 96% and 150 grams Of toluene; this is brought to 100° C. and over two hours one pours in 704 grams (5.5 moles) of C8 aldehyde (purity: 98%; product obtained by oxo synthesis from propylene polymers, heptene cut) while using azeotropic distillation to eliminate the water formed. The azeotropic distillation is then continued for 2 hours; concentration is then carried out at atmospheric pressure until 200° C.; it is put under vacuum and maintained for 30 minutes at 200° C. at a pressure of 50 mm Hg. The resin is decanted in the form of a reddish brown solid with a yield of 972 grams (i.e., a yield of 92% in relation to the raw materials employed, taking into account their purity). The ball-and-ring melting point is 108° C. and the free-phenol content is 0.6%.

Example 4

Into a three-necked flask equipped with a stirring apparatus and a refrigerant, one introduces 564 grams of phenol (6 moles) and 5.6 grams of a 50% solution of octylphenolsulfonic acid in toluene; this is brought to 100° C. and over 15 minutes one pours in 114 grams of a 50% solution of formaldehyde (1.9 moles). This is kept at reflux for 1.5 hours and one then passes to atmospheric concentration until the temperature of the reactional medium is ca. 135° C. Cooling to ca. 110° C. is carried out and then one adds 200 grams of toluene. A Dean-Stark separator is introduced into the apparatus and over 45 minutes one pours in 592.8 grams of the previously described C10 aldehyde (3.8 moles) while using azeotropic distillation to eliminate the water formed. The azeotropic distillation is then continued for 2 hours; concentration is then carried out at atmospheric pressure until 200° C.; it is put under vacuum and maintained for 30 minutes at 200° C. at a pressure of 50 mm Hg. The resin is decanted in the form of a red solid. The yield is 1009 grams (i.e., a yield of 91% in relation to the raw materials employed, taking into account the purity of the aldehyde). The ball-and-ring melting point is 98° C. and the free-phenol content is 0.3%.

Example 5

The procedure of Example 4 is repeated with the exception of introducing 192 grams of the 50% formaldehyde solution and 249.6 grams of C10 aldehyde. An orange resin is recovered which has a ball-and-ring melting point of 101° C. and a free-phenol content of 0.8%. The yield is 728 grams (89% of the theoretical yield).

Example 6

Into a three-necked flask equipped with a Dean-Stark separator, a dropping funnel and a stirring apparatus, one introduces while stirring 572 grams of phenol (6 moles), 200 grams of toluene and 7.5 grams of a 50% octylphenolsulfonic acid solution in toluene; this is brought to 100° C. and one pours in over 45 minutes 312 grams of C10 aldehyde (2 moles) while using azeotropic distillation to eliminate the water formed. The distillation is then continued for 45 minutes. One passes to total reflux and one pours in over 30 minutes 240 grams of a 50% solution of formaldehyde (4 moles). Reflux is maintained for 1 hour and then one passes to atmospheric concentration until 200° C. in the reaction medium; it is put under vacuum and maintained for 30 minutes at 200° C. at a pressure of 50 mm Hg. The resin is decanted in the form of a red solid. The yield is 922 grams (i.e., 86% in relation to the raw materials employed, taking into account the purity of the aldehyde).

The ball-and-ring melting point is 100° C. and the free-phenol content is 0.9%.

Example 7

Into a three-necked flask equipped with a Dean-Stark separator, a dropping funnel and a stirring apparatus, one introduces while stirring 517 grams of phenol (5.5 moles), 150 grams of toluene, 15.5 grams of 96% sulfuric acid and 277.2 grams (1.32 moles) of 2-nonylpentenal (aldehyde obtained by crotonization of heptanal); this is brought to 100° C. while using azeotropic distillation to eliminate the water formed for 1.5 hours. One then pours in over 45 minutes 602 grams of heptanal (5.28 moles) while continuing the azeotropic distillation. The azeotropic distillation is then maintained for one hour and then one passes to atmospheric pressure until 200° C. in the reactional medium; it is put under vacuum and maintained for 30 minutes at 200° C. at a pressure of 50 mm Hg. The resin is decanted in the form of a brown solid with a yield of 1260 grams (i.e., 90% in relation to the raw materials employed, taking into account the purity of the aldehyde). The ball-and-ring melting point is 87° C. and the free-phenol content is 0.5%.

Example 8

Into a three-necked flask equipped with a Dean-Stark separator, a dropping funnel and a stirring apparatus, one introduces while stirring 550 grams of resorcinol (5.5 moles), 200 grams of toluene and 2.8 grams of a 65% solution of paratoluenesulfonic acid; this is brought to 100° C. and over two hours one pours in 625 grams (4.4 moles) of the previously described C10 aldehyde while using azeotropic distillation to eliminate the water formed; the azeotropic distillation is then continued for 2 hours; concentration is then carried out at atmospheric pressure until 150° C.; it is put under vacuum and maintained for 30 minutes at 150° C. at a pressure of 50 mm Hg. The resin is decanted in the form of a red solid with a yield of 1032 grams (i.e., a yield of 94% in relation to the raw materials employed, taking into account the purity of the aldehyde). The ball-and-ring melting point is 96° C. and the free-resorcinol content is 8.4%.

An equivalent resorcinol resin, but synthesized with formaldehyde, has a free-resorcin level of ca. 19%; in contrast, the resin of the invention, unlike the formaldehyde resorcinol novolaks, is not hydrophilic and therefore does not become sticky when left in the ambient air. These are two substantial advantages because they eliminate a major cause of lumpiness and decrease the problems of volatiles and efflorescence of rubbers when these resins are used.

Example 9

This example illustrates a synthesis of novolaks containing bifunctional phenols.

Into a three-necked flask equipped with a Dean-Stark separator, a dropping funnel and a stirring apparatus, one introduces while stirring 377 grams of phenol (4 moles), 277 grams of paraoctylphenol (1.34 mole) and 10.2 grams of sulfuric acid concentrated to 96%; this is brought to 100° C. and over two hours one then pours in 762.8 grams (6.7 moles) of heptanal (provided by the ATOCHEM firm, 95% purity) while using azeotropic distillation to eliminate the water formed. The azeotropic distillation is then continued for two hours; one then adds 17.6 grams of morpholine for neutralization and then concentration is carried out under atmospheric pressure until 200° C.; it is then put under vacuum and maintained for 30 minutes at 200° C. at a pressure of 50 mm Hg. The resin is decanted with a yield of 1266 grams (i.e., 98% in relation to the raw materials employed, taking into account the purity of the aldehyde). The ball-and-ring melting point is 82° C. and the free-phenol content is 3%.

Example 10

Example of application of the resins as reinforcers in rubber for manufacturing tire beads.

| Composition of the rubber mixture: | |
|---|---|
| Natural rubber | 60 |
| Butadiene rubber | 40 |
| Carbon black | 80 |
| Oil | 5 |
| Stearic acid | 1.5 |
| Zinc oxide | 7 |
| Reinforcing resin (phenolic novolak) | 15 |
| Hexamethylenetetramine | 3 |
| Insoluble sulfur | 2.2 |
| Accelerator/retardant system | 1.4 |
| Protection agent | 1 |

Operating Procedure

Banbury internal mixer with a capacity of 1.85 liters
Filling coefficient: 0.9
Initial rotor speed: 75 rpm
Temperature at the beginning of the cycle: 70° C.

| Cycle Timetable | |
|---|---|
| t = 0 | incorporation of the natural rubber |
| t = 1 min 30 sec | incorporation of the butadiene rubber |
| t = 2 min 30 sec | incorporation of the oil and half of the black |
| t = 3 min 30 sec | incorporation of the other half of the black and of the mortar-ground resin |
| t = 4 min 30 sec | incorporation of the zinc oxide, stearic acid and the antioxidant |
| t = 6 min | completion of the mixture (temperature between 145 and 155° C.) |

Upon completion of the internal mixer processing, the mixtures are formed into sheets by passage over rollers at 70° C. and then allowed to rest until the next day. Restarting is carried out on an external cylinder mixer at 70° C. with a cylinder speed of 2418 rpm.

| | |
|---|---|
| t = 0 | master mixture put in |
| t = 1 min | incorporation of the accelerator |
| t = 3 min | incorporation of the retardant |
| t = 4 min | incorporation of the sulfur |
| t = 6 to 10 min | homogenization, then 6 passages until the end |
| t = 10 min | removal of the mixture |

Vulcanization temperature: 160° C.
Test Standards
MOONEY viscosity at 100° C.: NFT Standard 43-005
MOONEY roasting at 121° C.: NFT Standard 43-004.
$t_3$ and $t_{18}$ are the times in minutes and seconds at the end of which the viscosity has increased by 3 points and 18 points, respectively; vulcanization index = $t_{18} - t_3$
MONSANTO Rheometry: NFT Standard 43-015
Test temperature: the vulcanization temperature is 160° C.; ML and MH are the minimum and maximum pairs;
$t_s(0.2)$: time in minutes and seconds for which the viscosity is minimum;

$t_c(90)$: time in minutes and seconds for which the viscosity reaches 90% of the maximum recordable pair. (This value is taken as the vulcanization time).

Instantaneous SHORE A Hardness: NFT Standard 46-052

Permanent deformation after compression: NFT Standard 46-011 (22 hours/25%/70° C.)

Traction modulus at 10% elongation: traction rate 100 mm/min measured after stabilization.

The last three tests are carried out for each mixture on 300×300×2 mm sheets intended for cutting traction specimens and for hardness measurements.

References to the exemplified resins
Control: test without resin or hexamethylenetetramine
No. 1: phenol/formaldehyde novolak resin, ball-and-ting melting point: 100° C.; free phenol: 0.5%
No. 2: resin of Counterexample 1 ter
No. 3: resin of Example 1
No. 4: resin of Example 4
No. 5: resin of Example 7

The results of these tests are shown in the following table.

The expert in the field will see from these examples the value of the new phenol/heavy aldehyde novolak resins in relation to the known formaldehyde or isobutyraldehyde novolaks: low viscosity in the crude state, long t3 (scorch time), short vulcanization index, good hardness. We are not dealing here with optimized mixtures, from which we could reasonably anticipate the achievement of better performances by using the resins in accordance with the invention.

TABLE 1

| Resins | Control | 1 | 2 | 3 | 4 | 5 |
|---|---|---|---|---|---|---|
| MOONEY Viscosity (100° C.) | 98.5 | 112.5 | 106 | 86 | 95 | 101 |
| MOONEY Rheometry (121° C.) | | | | | | |
| Minimum viscosity | 48 | 53 | 48 | 41.5 | 44.5 | 49.5 |
| t3 (minutes: seconds) | 48:05 | 12:36 | 15:05 | 17:48 | 21:40 | 15:00 |
| t18 (minutes: seconds) | 57:17 | 37:36 | 39:10 | 34:15 | 41 | 34:10 |
| Vulcanization index | 9:10 | 25:00 | 16:27 | 19:20 | 19:10 | |
| MONSANTO Rheometry (160° C.) | | | | | | |
| ML (Nm) | 2.77 | 2.67 | 2.46 | 2.27 | 2.3 | 2.43 |
| MH (Nm) | 10.48 | 13.19 | 13.58 | 13.65 | 13.85 | 13.14 |
| ts (0.2) (minutes: wands) | 3:45 | 1:41 | 1:53 | 1:50 | 1:59 | 1:48 |
| t90 (minutes: seconds) | 10:02 | 8:16 | 8:04 | 7:49 | 8:18 | 7:43 |
| SHORE Hardness A (23° C.) | 72 | 91 | 89 | 91 | 92 | 93 |
| Traction niodulus at 10% elongation | 1.8 | 1.77 | 1,93 | 1.96 | 2.14 | |
| Permanent deformation (%) | 30.2 | 43.3 | 44 | 56.2 | 49.5 | 51.7 |

We claim:

1. The process for the preparation of novolak resins in which the aldehydes: phenols ratio is between 0.9 and 1.2 and in which at least 50% of the aldehyde compounds originate from aliphatic aldehydes with a number of carbon atoms equal to or greater than 6, which consists in reacting the phenol reagents and the aldehyde reagents in the presence of acid catalysts and in eliminating the water of reaction as soon as it is formed.

* * * * *